US009188174B2

(12) United States Patent
Beiser et al.

(10) Patent No.: US 9,188,174 B2
(45) Date of Patent: Nov. 17, 2015

(54) CONTROLLABLE OR SELECTABLE COUPLING ASSEMBLY HAVING AN OVERRUN MODE AND A RETAINED CONTROL ELEMENT

(71) Applicant: Means Industries, Inc., Saginaw, MI (US)

(72) Inventors: Carl T. Beiser, Freeland, MI (US); George J. Coppens, Bay City, MI (US); Brice A. Pawley, Midland, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 32 days.

(21) Appl. No.: 14/150,074

(22) Filed: Jan. 8, 2014

(65) Prior Publication Data
US 2014/0116832 A1 May 1, 2014

Related U.S. Application Data

(62) Division of application No. 13/611,001, filed on Sep. 12, 2012, now Pat. No. 8,844,693.

(60) Provisional application No. 61/750,877, filed on Jan. 10, 2013.

(51) Int. Cl.
*F16D 41/12* (2006.01)
*F16D 41/14* (2006.01)
(52) U.S. Cl.
CPC .............. *F16D 41/125* (2013.01); *F16D 41/14* (2013.01)
(58) Field of Classification Search
None
See application file for complete search history.

(56) References Cited

U.S. PATENT DOCUMENTS

| 5,449,057 | A | 9/1995 | Frank |
| 5,927,455 | A | 7/1999 | Baker et al. |
| 6,244,965 | B1 | 6/2001 | Klecker et al. |
| 6,290,044 | B1 | 9/2001 | Burgman et al. |
| 7,258,214 | B2 | 8/2007 | Pawley et al. |

(Continued)

FOREIGN PATENT DOCUMENTS

EP 1 873 416 A1 * 1/2008

OTHER PUBLICATIONS

International Search Report and Written Opinion; International application No. PCT/US2014/010968; date of mailing May 2, 2014.

(Continued)

*Primary Examiner* — Rodney H Bonck
(74) *Attorney, Agent, or Firm* — Brooks Kushman P.C.

(57) ABSTRACT

A controllable or selectable coupling assembly having an overrun mode and a retained control element is provided. The assembly includes first and second coupling members having first and second coupling faces, respectively, in close-spaced opposition with one another. A locking member is disposed between the coupling faces of the coupling members. The locking member is movable between first and second positions. A control element is mounted for controlled movement between the coupling faces and is operable to control position of the locking member. The control element has at least one opening which extends completely therethrough to allow the locking member to extend therethrough. A retainer mechanism is operative to allow limited movement of the control element towards the first coupling face and prevent the control element from contacting the first coupling member in the overrun mode thereby reducing spin losses when the assembly is disengaged.

21 Claims, 5 Drawing Sheets

(56) References Cited

U.S. PATENT DOCUMENTS

| | | |
|---|---|---|
| 7,344,010 B2 | 3/2008 | Fetting, Jr. et al. |
| 7,484,605 B2 | 2/2009 | Pawley et al. |
| 7,491,151 B2 | 2/2009 | MaGuire et al. |
| 7,743,678 B2 | 6/2010 | Wittkopp et al. |
| 7,992,695 B2 | 8/2011 | Wittkopp et al. |
| 8,051,959 B2 | 11/2011 | Eisengruber |
| 8,079,453 B2 | 12/2011 | Kimes |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0194381 A1 | 8/2009 | Samie et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0183806 A1 | 7/2011 | Wittkopp et al. |
| 2011/0192697 A1 | 8/2011 | Prout et al. |
| 2012/0145506 A1 | 6/2012 | Samie et al. |
| 2013/0277164 A1 * | 10/2013 | Prout et al. .................. 192/69.9 |

OTHER PUBLICATIONS

International Preliminary Report on Patentability; International application No. PCT/US2014/010968; date of issuance of report Jul. 14, 2015.

* cited by examiner

CONTROLLABLE OR SELECTABLE COUPLING ASSEMBLY HAVING AN OVERRUN MODE AND A RETAINED CONTROL ELEMENT

CROSS-REFERENCE TO RELATED APPLICATIONS

This application claims the benefit of U.S. provisional application Ser. No. 61/750,877, filed Jan. 10, 2013, and is a continuation-in-part of U.S. Application entitled "Coupling Assembly Having an Overrun Mode and Ratcheting Reverse Strut Or Radial Ratchet for Use Therein" filed Sep. 12, 2012, and having U.S. Ser. No. 13/611,001.

TECHNICAL FIELD

This invention relates, in general, to the field of controllable or selectable coupling assemblies and, more particularly, to controllable or selectable coupling assemblies having a retained control element.

Overview

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:
  roller type which includes spring-loaded rollers between inner and outer races of the one-way clutch. (Roller type is also used without springs on some applications); and
  sprag type which includes asymmetrically shaped wedges located between inner and outer races of the one-way clutch.

One way clutches typically over run during engine braking rather than enable engine braking It is for this reason there is a friction pack at the same transmission node. Selectable dynamic clutches can be used to prevent the over running condition and enable engine braking Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include 2012/0145506; 2011/0192697; 2011/0183806; 2010/0252384; 2010/0230226; 2010/0200358; 2009/0194381; 2008/0223681; 2008/0169166; 2008/0185253; and the following U.S. Pat. Nos. 8,079,453; 7,992,695, 8,051,959, 7,743,678; and 7,491,151.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The term "coupling", "clutch" and "brake" may be used interchangeably.

As transmission efficiency has become increasingly more important over the last several years, many transmission manufacturers have started to make specifications regarding the amount of torque it takes to spin a one-way clutch during overrun conditions (i.e., spin loss).

One source of such spin loss or drag torque is when a selector plate is urged into contact with a notch plate by spring-biased reverse struts.

SUMMARY OF EXAMPLE EMBODIMENTS

An object of at least one embodiment of the present invention is to provide a controllable or selectable coupling assembly having an overrun mode and a retained control element wherein spin loss (i.e., drag torque) is reduced thereby resulting in increased transmission efficiency.

In carrying out the above object and other objects of at least one embodiment of the present invention, a controllable or selectable coupling assembly having an overrun mode is provided. The assembly includes first and second coupling members having first and second coupling faces, respectively, in close-spaced opposition with one another. At least one of the members is mounted for rotation about an axis. The first coupling face has a plurality of recesses. Each of the recesses defines a load-bearing first shoulder. The second coupling face has at least one recess defining a load-bearing second shoulder a locking member is disposed between the coupling faces of the coupling members. The locking member is movable between first and second positions. The first position is characterized by abutting engagement of the locking member with a respective shoulder of each coupling member and the second position is characterized by a non-abutting engagement of the locking member with at least one of the coupling members. A control element is mounted for controlled movement between the coupling faces and is operable to control position of the locking member. The control element has at least one opening which extends completely therethrough to allow the locking member to extend therethrough to the first position in a control position of the control element. A retainer mechanism is operative to allow limited movement of the control element towards the first coupling face and prevent the control element from contacting the first coupling member in the overrun mode thereby reducing spin losses when the assembly is disengaged.

The mechanism may include at least one groove formed in the first coupling member and at least one part integrally formed with the control element to move therewith. Each part is slidably received and retained within its respective groove to allow the controlled and limited movements.

Each part may comprise a hold down tab.

The mechanism may include an annular retaining member to retain the second coupling member and the control element together.

The retaining member may comprise a snap ring.

One of the coupling members may be a notch plate and the other of the coupling members may be a pocket plate.

The assembly may be a controllable or selectable one-way clutch assembly.

The locking member may be a reverse strut.

The control element may be a control or selector plate rotatable about the axis.

Further in carrying out the above object and other objects of at least one embodiment of the present invention, a controllable or selectable coupling assembly having an overrun mode is provided. The assembly includes first and second coupling members including first and second coupling faces, respectively, in close-spaced opposition with one another. At least one of the members is mounted for rotation about an axis. The first coupling face has a plurality of recesses. Each of the recesses defines a load-bearing first shoulder. The second coupling face has at least one recess defining a load-bearing second shoulder. At least one locking member is disposed between the coupling faces of the coupling members. Each locking member is movable between first and second positions. The first position is characterized by abutting engagement of the locking member with a respective shoulder of each coupling member and the second position is characterized by a non-abutting engagement of the locking member with at least one of the coupling members. At least one biasing member is carried by the second coupling member to bias its respective locking member toward the first position. A control element is mounted for controlled movement between the coupling faces and is operable to control position of each locking member. The control element has at least one opening which extends completely therethrough to allow its respective locking member to extend therethrough to the first position in a control position of the control element. Each biased locking member applies a locking member force on the control element. A retainer mechanism is operative to isolate each locking member force and prevent the control element from contacting the first coupling member in the overrun mode thereby reducing spin losses when the assembly is disengaged.

The mechanism may include at least one groove formed in the first coupling member and at least one part integrally formed with the control element to move therewith. Each part is slidably received and retained within its respective groove to allow the controlled movement.

Each part may comprise a hold down tab.

The mechanism may include an annular retaining member to retain the second coupling member and the control element together.

The retaining member may comprise a snap ring.

Each biasing member may include a biasing spring.

Each recess of the second coupling face may include an inner recess to receive its respective biasing spring.

Still further in carrying out the above object and other objects of at least one embodiment of the present invention, a controllable or selectable coupling assembly having an overrun mode is provided. The assembly includes first and second coupling members including first and second coupling faces, respectively, in close-spaced opposition with one another. At least one of the members is mounted for rotation about an axis. The first coupling face has a plurality of first recesses. Each of the first recesses defines a load-bearing first shoulder. The second coupling face has a plurality of second recesses. Each of the second recesses defines a load-bearing second shoulder. A plurality of locking members are disposed between the coupling faces of the coupling members. Each of the locking members is movable between first and second positions. The first position is characterized by abutting engagement of a locking member with a respective shoulder of each coupling member and the second position is characterized by a non-abutting engagement of the locking member with at least one of the coupling members. A control element is mounted for controlled movement between the coupling faces and is operable to control position of the locking members. The control element has a plurality of openings which extends completely therethrough to allow each of the locking members to extend therethrough to its respective first position in a control position of the control element. A retainer mechanism is operative to allow limited movement of the control element towards the first coupling face and prevent the control element from contacting the first coupling member in the overrun mode thereby reducing spin losses when the assembly is disengaged.

The mechanism may include at least one groove formed in the first coupling member and at least one part integrally formed with the control element to move therewith. Each part is slidably received and retained within its respective groove to allow the controlled and limited movements.

Each part may comprise a hold down tab.

The mechanism may include an annular retaining member to retain the second coupling member and the control element together.

The retaining member may comprise a snap ring.

The coupling faces may be annular coupling faces.

The annular coupling faces may be oriented to face axially along the axis wherein the retainer mechanism is operative to allow limited axial movement of the control element.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

BRIEF DESCRIPTION OF THE DRAWINGS

FIG. 5 is a view, similar to the view of FIG. 4, with the tab of the retainer mechanism positioned near the top of the axially extending groove of FIG. 4;

FIG. 6 is a view, similar to the view of FIG. 5, with the tab positioned in the axially extending groove;

FIG. 7 is a view, similar to the views of FIGS. 5 and 6, with the tab positioned near the bottom of the axially extending groove;

FIG. 8 is a view, similar to the views of FIGS. 5-7, with the tab now positioned in both the circumferentially extending groove and the axially extending groove;

FIG. 9 is a view, similar to the views of FIGS. 5-8, wherein the tab is now fully positioned in the circumferentially extending groove prior to movement of the tab to the position of FIG. 4.

DETAILED DESCRIPTION

Figure 1:
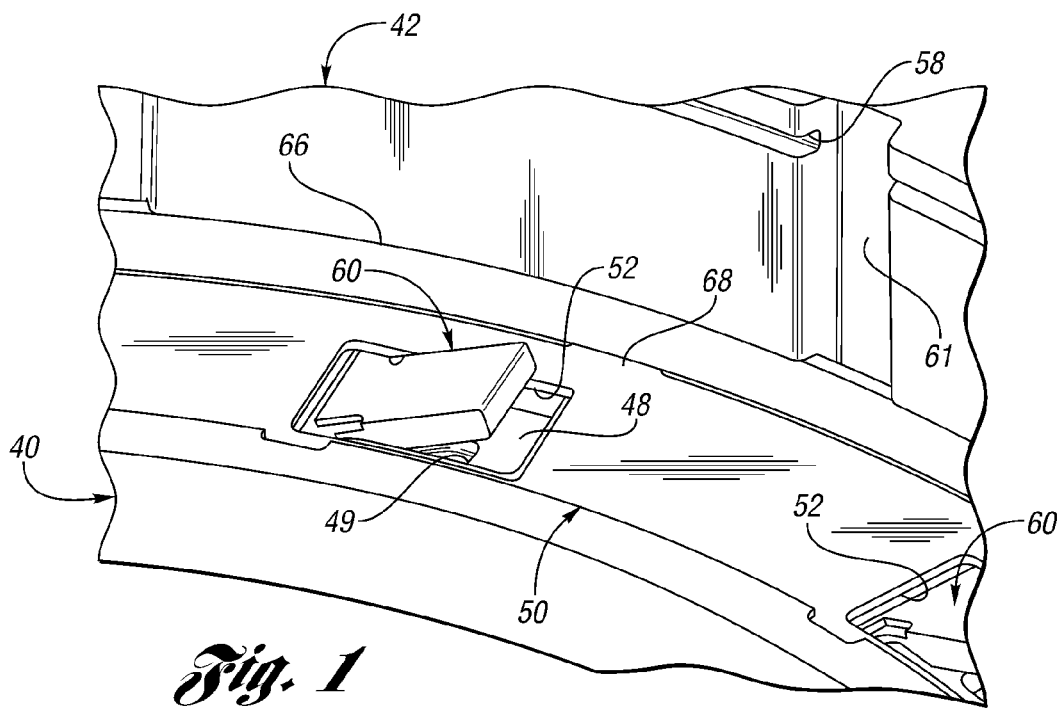
FIG. 1 is an enlarged perspective schematic view, partially broken away, of a control element (selector plate) with a tab which is retained by a retainer mechanism in the form of a radially thin, axially thick snap ring.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, at least one embodiment of the present invention comprises a coupling assembly. The coupling assembly preferably comprises a controllable or selectable one-way clutch assembly, generally indicated at 10 in FIG. 10. The assembly 10 includes first and second coupling members preferably in the form of a notch plate, generally indicated at 12, and a pocket plate, generally indicated at 14, respectively. The plates 12 and 14 include first and second coupling faces 16 and 18, respectively, in close-spaced opposition with one another. At least one of the plates 12 and 14 is mounted for rotation in a direction 19 about an axis. The first coupling face 16 has a plurality of recesses 20. Each of the recesses 20 defines a load-bearing first shoulder 22. The second coupling face 18 has at least one recess 24 which defines a load-bearing second shoulder 26.

A locking member in the form of reverse strut, generally indicated at 28, is disposed between the coupling faces 16 and 18 of the coupling members 12 and 14, respectively. The strut 28 is movable between first and second positions. The first position (shown in FIG. 10) is characterized by abutting engagement of the strut 28 with the shoulders 22 and 26.

Figure 10:
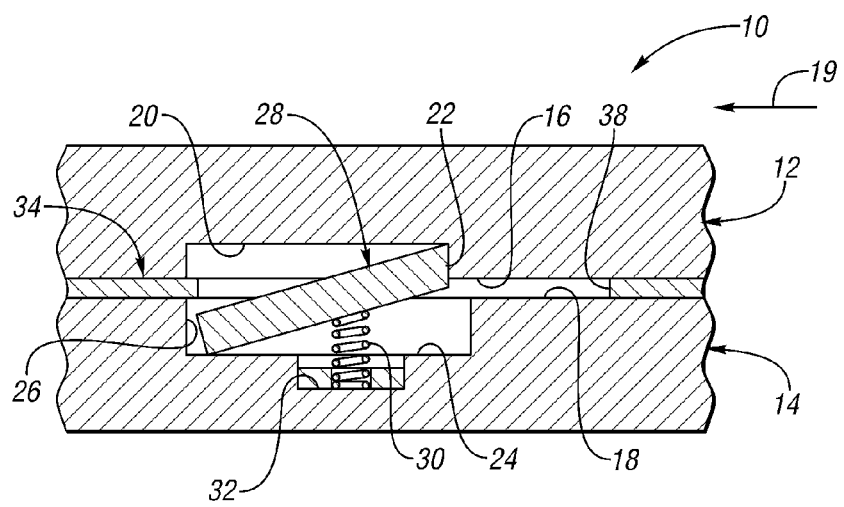
FIG. 10 is a side view, partially broken away and in cross section, of pocket, notch and selector plates with a reverse strut biased by a spring to an engaged position.

At least one biasing member such as a biasing, coil spring 30 is carried by the second coupling member 14 within an inner recess 32 of the recess 24 to bias its respective strut 28 toward the first position of FIG. 10.

A control element in the form of a selector or slide plate, generally indicated at 34, is operable to control position of the locking member or strut 28. The control element or plate 34 has at least one opening 38 which extends completely therethrough to allow its respective locking member 28 to extend therethrough to the first position (FIG. 10) in a control position of the control element 28. Each locking member 28 applies a locking member force on the control element 34 due to the biasing of the coil spring 30.

FIGS. 1-9 show a coupling member including a pocket member or plate, generally indicated at 40, of a planar or overrunning coupling or clutch assembly constructed in accordance with an embodiment of the present invention. The coupling member includes an annular wall, generally indicated at 42, which is integrally formed with the pocket plate 40.

A coupling member or notch plate (not shown in FIGS. 1-9 but generally similar to the notch plate 12 of FIG. 10) is preferably nested within the pocket plate 40. The notch plate is to be connected to a part (not shown) via internal splines formed on the notch plate, which engage splines on the part. The pocket plate 40 may be provided with external splines or locking members 44 as illustrated in FIGS. 2 and 4-9.

An actuator (not shown) may be drivably connected to a selector or control element or plate, generally indicated at 50 in FIGS. 1-9, thereby causing the control plate 50 to be adjusted angularly with respect to a central axis about which at least one of the pocket and notch plates is rotatable. The control plate 50 is disposed between the pocket and notch plates for limited angular rotation relative to the pocket and notch plates, as generally illustrated in U.S. Pat. No. 7,344,010, and has a plurality of apertures 52 extending completely therethrough as is described hereinbelow.

The control element or plate 50 is typically not a full circular part thereby requiring less material to manufacture the part. Hence, the notch, pocket and control plates can be nested closer together during a stamping assembly operation. Also, because the control plate 50 may not be fully circular, it is easier to install into the clutch.

As in the embodiment of FIG. 10, the notch plate can free-wheel in one angular direction about the central axis relative to the pocket plate 40. The one-directional, free-wheeling motion is achieved in an operating mode when the actuator adjusts the angular position of the control plate 50 relative to the pocket plate 40 (such as via a fork) about the central axis to a forward position which is obtained by moving the control plate 50 angularly a few degrees (such as 10°) from its reverse position.

The notch plate typically has an inside or reference surface with one or more notches or recesses formed therein and separated by common walls. The notch plate is adapted to be received in the pocket plate 40.

The pocket plate 40 has an inside surface or face 46 with recesses 48 formed in corresponding pawl-holding portions of the plate 40. Located intermediate the inside surface or face 46 of the plate 40, is the control plate 50.

In the embodiments of FIGS. 1-9, there are preferably a plurality of reverse struts or pawls, generally indicated at 60, received and retained in their respective recesses 48 in the pocket plate 40. A plurality of the pawls may be forward pawls for transferring torque in a forward direction about the central axis. The reverse struts 60 prevent rotation between the pocket and notch plates in a "reverse" direction about the central axis.

When the control plate 50 is situated in its "forward" position it covers the "reverse" set of spring-biased pawls or struts 60. The spring-based struts 60 exert a force on the control plate 12 which urges the control plate 50 towards the notch plate. When the control plate 50 is situated in its "reverse" position it does not cover the "reverse" set of struts 60. When uncovered, the "reverse" struts 60 are allowed to ratchet relative to the pocket plate 40. As shown in FIGS. 1-9, the control plate 50 is provided with the apertures 52. These are spaced and arranged angularly about the central axis. When the control plate 50 is appropriately positioned in its "reverse" position, one aperture 52 will be disposed directly over each recess 48. The apertures 52 and the notches in the notch plate are sized so that portions of the reverse pawls 60 can enter the notches of pawl-receiving portions of the notch plate and engage shoulders of the notches to establish a locking action between the reverse pawls 60 and the notch plate that will prevent rotation between the pocket plate 40 and the notch plate.

If the control plate 50 is rotated to a different (i.e., forward) angular position from the reverse position, the reverse pawls 60 rotate downwardly into their recesses 48 and will be at least partially covered by the control plate 50 and prevented from moving pivotally upward. When the control plate 50 is thus positioned, the notch plate can free-wheel about the central axis with respect to the pocket plate 40. However, as previously mentioned, the spring-biased struts 60 exert a spring force on the control plate 50.

The coupling assembly also generally includes a retainer mechanism operative to isolate locking member force exerted on the control plate 50 and prevent the control element or plate 50 from contacting the notch plate in the overrun mode thereby reducing spin losses when the assembly is disengaged. In general, the retainer mechanism may take the form of a ring, a groove, a combination of a ring and a groove to isolate reverse strut spring force and prevent the selector plate 50 from contacting the notch plate.

In the embodiments of FIGS. 4-9, the retainer mechanism includes at least one groove such as a circumferentially extending groove 62 formed in the inner surface of the wall 42 and at least one part or hold down tab 64 integrally formed with the control element 50 to move therewith. Each tab 64 is slidably received and retained within its respective groove 62 to allow the controlled movement.

The assembly of the control element 50 to the coupling member including the pocket plate 40 and the integrally formed wall 42 is shown in FIGS. 4-9. Axially extending grooves 61 allows the insertion of the control elements 50 to a position immediately adjacent the face 46 prior to control element rotation.

FIG. 1 shows a retainer mechanism in the form of a radially thin, axially thick snap ring 66 which holds down one or more integrally formed tabs 68 on the selector plate 50 to perform this retaining function.

Figure 2:
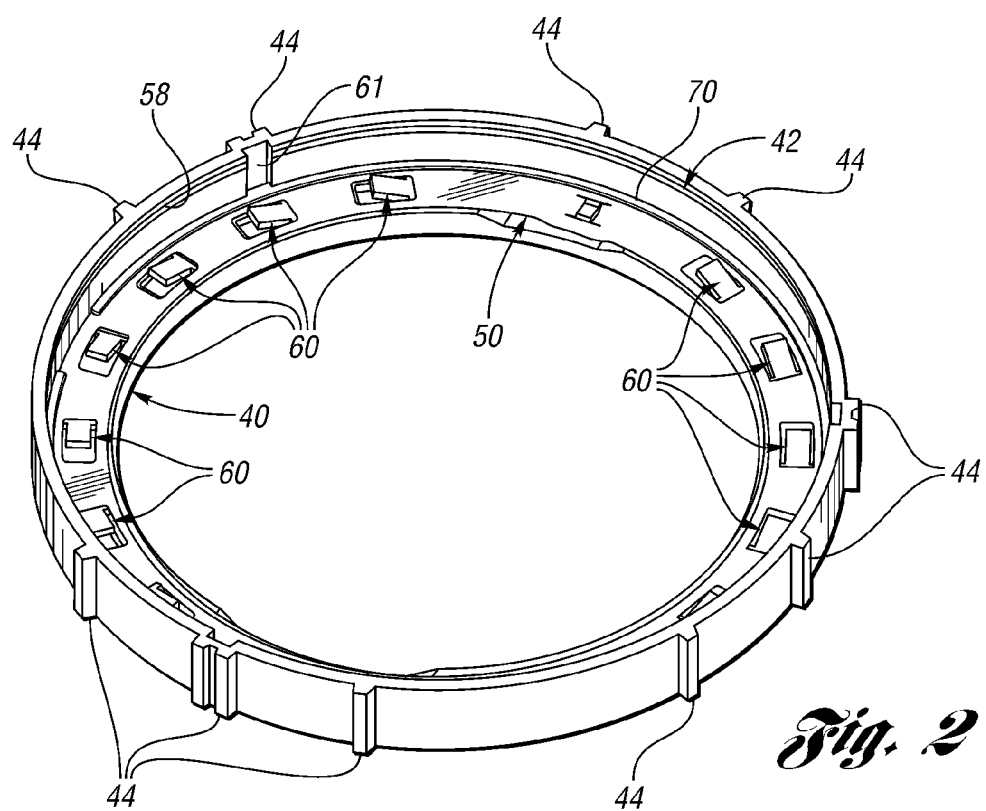
FIG. 2 is a perspective schematic view of a coupling member (i.e., pocket plate) with a number of locking members (reverse struts) wherein the selector plate is retained by a radially thick, axially thin snap ring without the need for a hold down tab on the selector plate.

FIG. 2 shows a retainer mechanism in the form of a radially thick, axially thin snap ring 70 to perform this retaining function without the need for a hold down tab on the selector plate 50.

Figure 3:
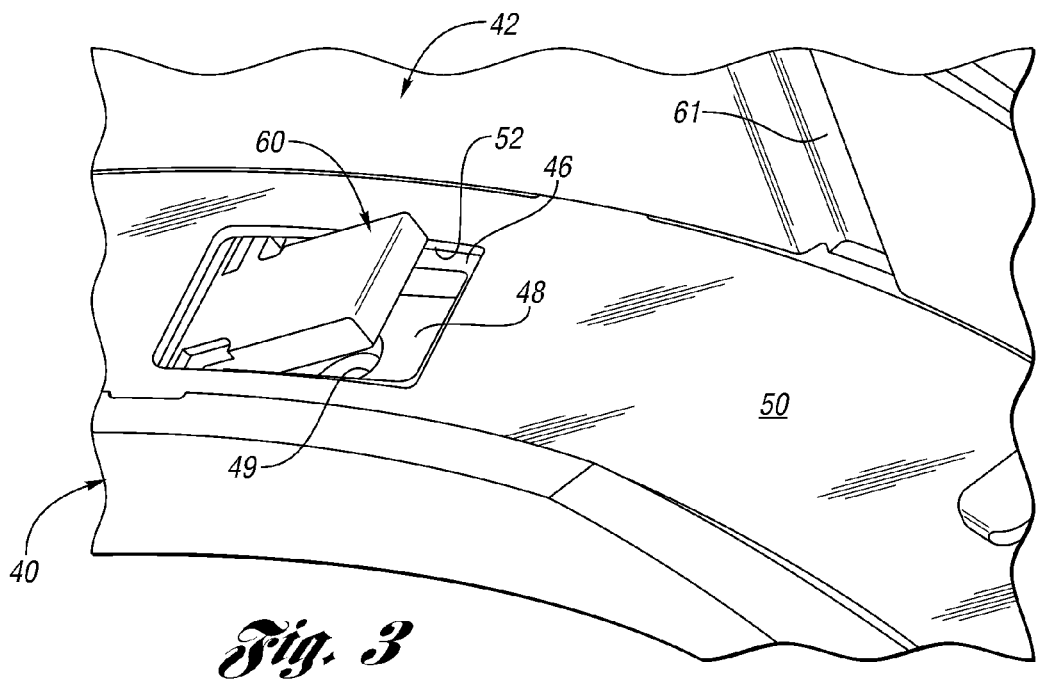
FIG. 3 is a view, similar to the view of FIG. 1, wherein the selector plate is held down by a retainer mechanism (i.e., groove in axially extending wall of coupling member including the pocket plate) without the need for a snap ring or axial tabs.
Figure 4:
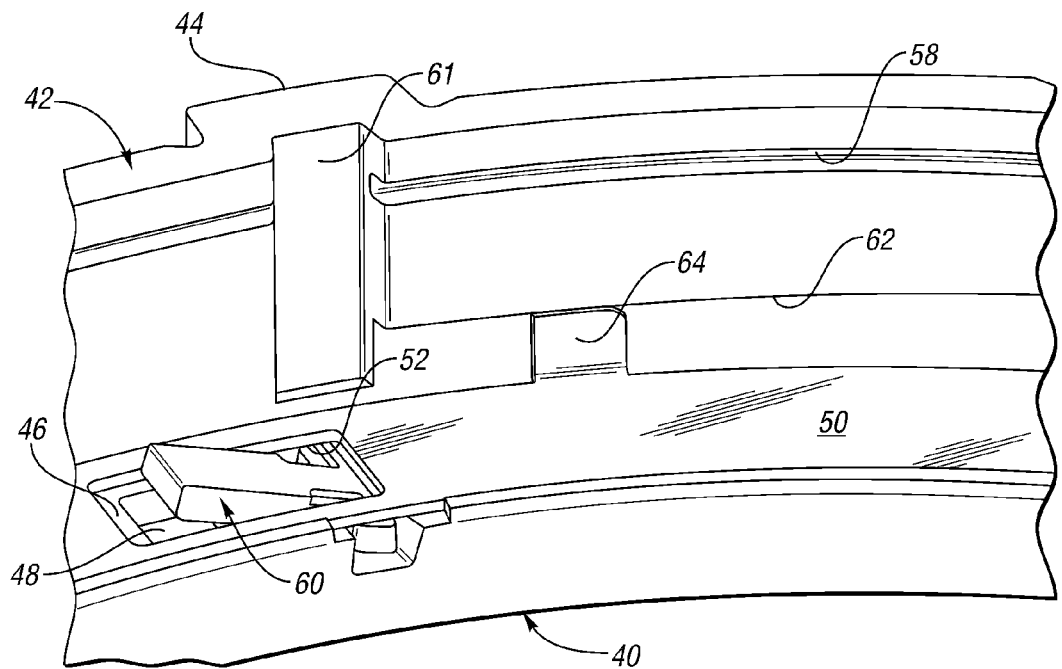
FIG. 4 is a view, similar to the view of FIGS. 1 and 3, wherein the selector plate has an axial hold down tab which is inserted into an axially extending groove in the axially extending wall of the coupling member and then rotated in a circumferentially extending groove to the position illustrated to retain the selector plate.
Figure 5:
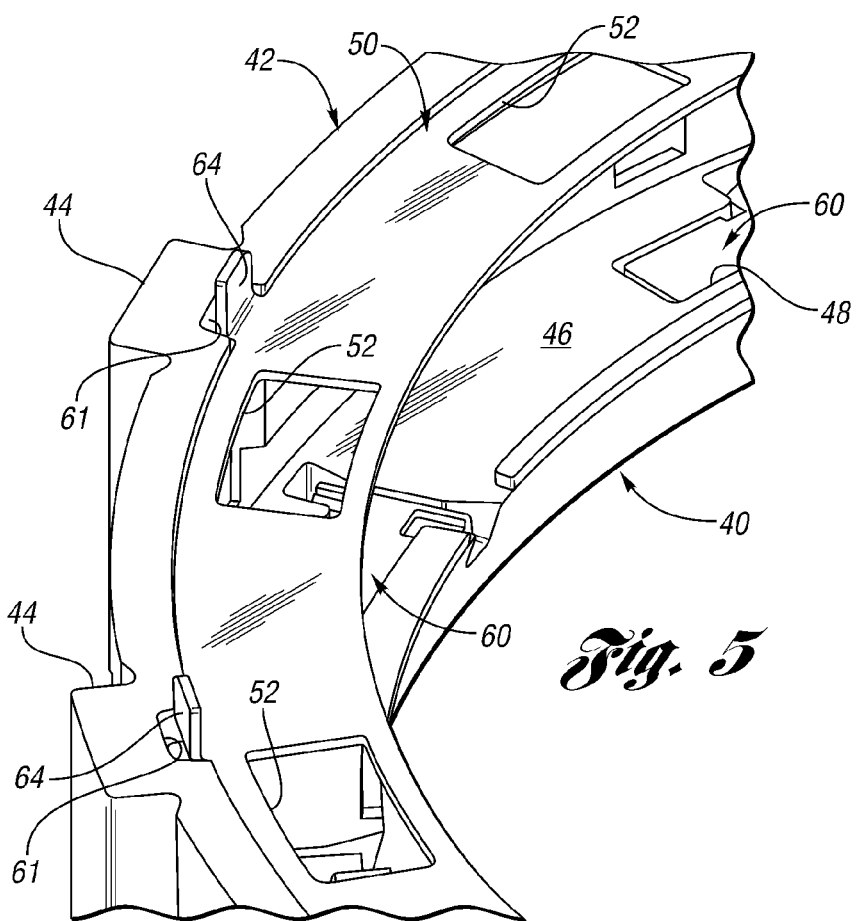
FIGS. 5 through 9 show how the control element is assembled to the coupling member including the pocket plate via the retainer mechanism.
Figure 6:
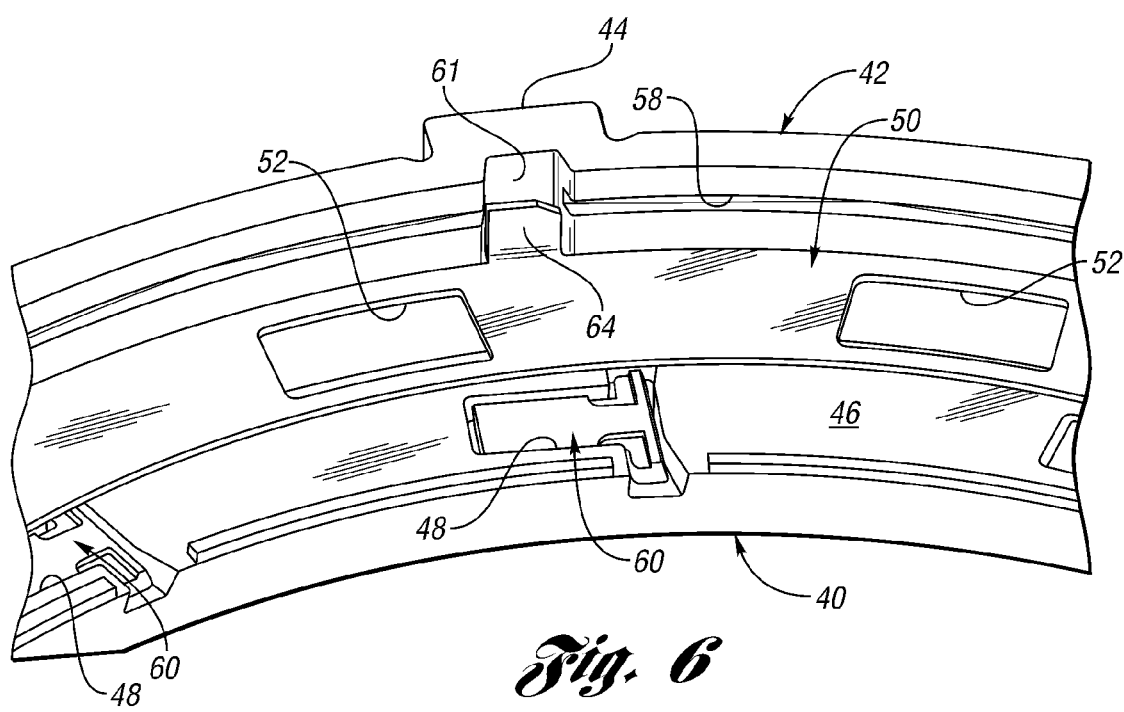
Figure 7:
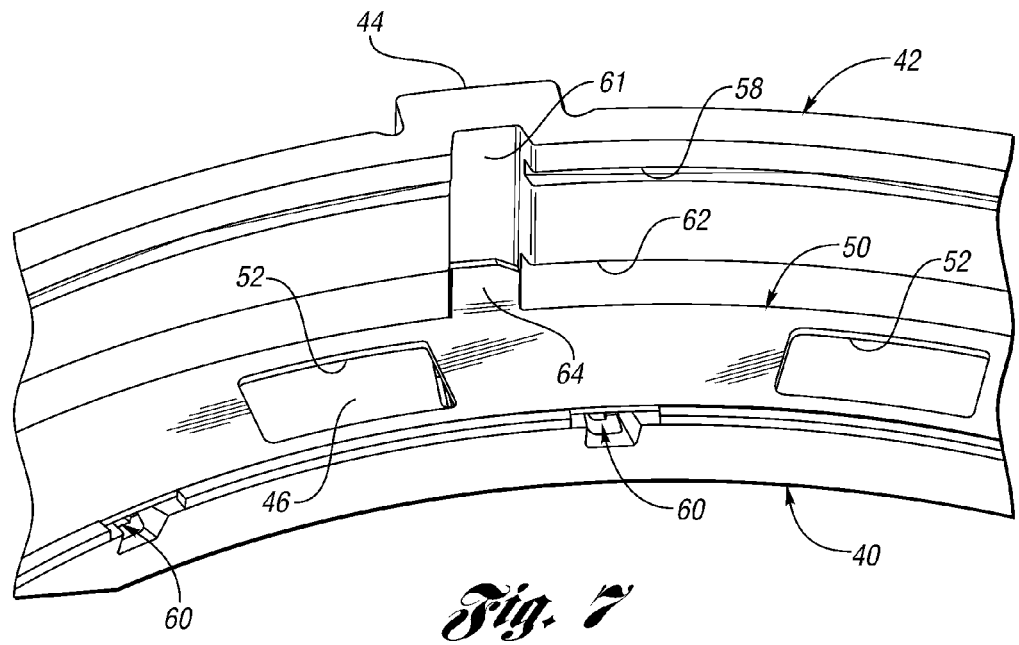
Figure 8:
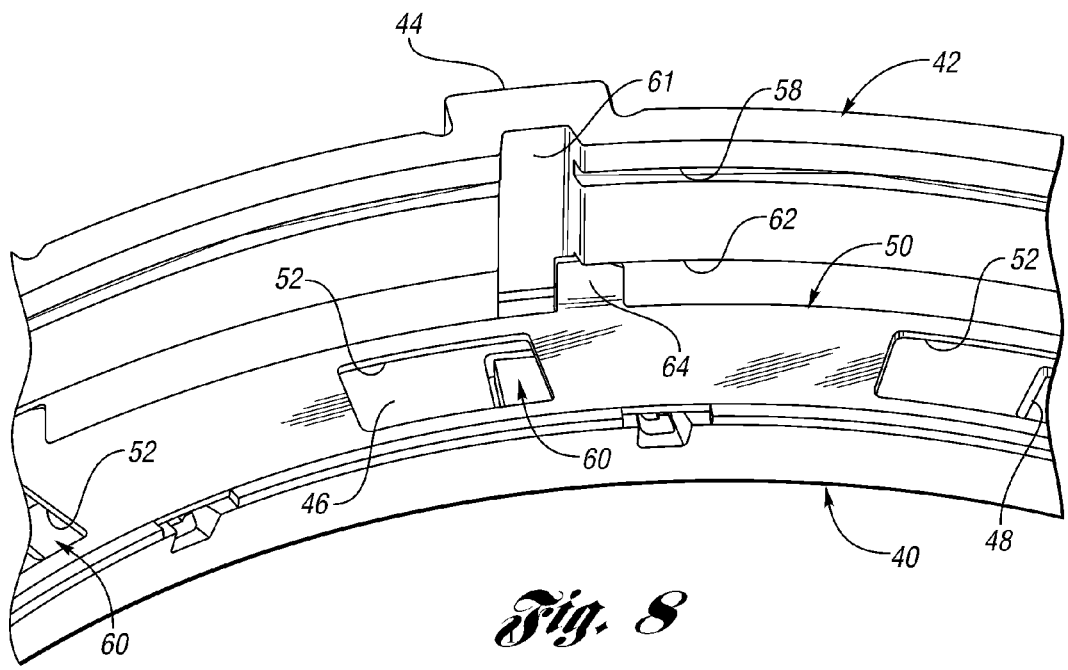
Figure 9:
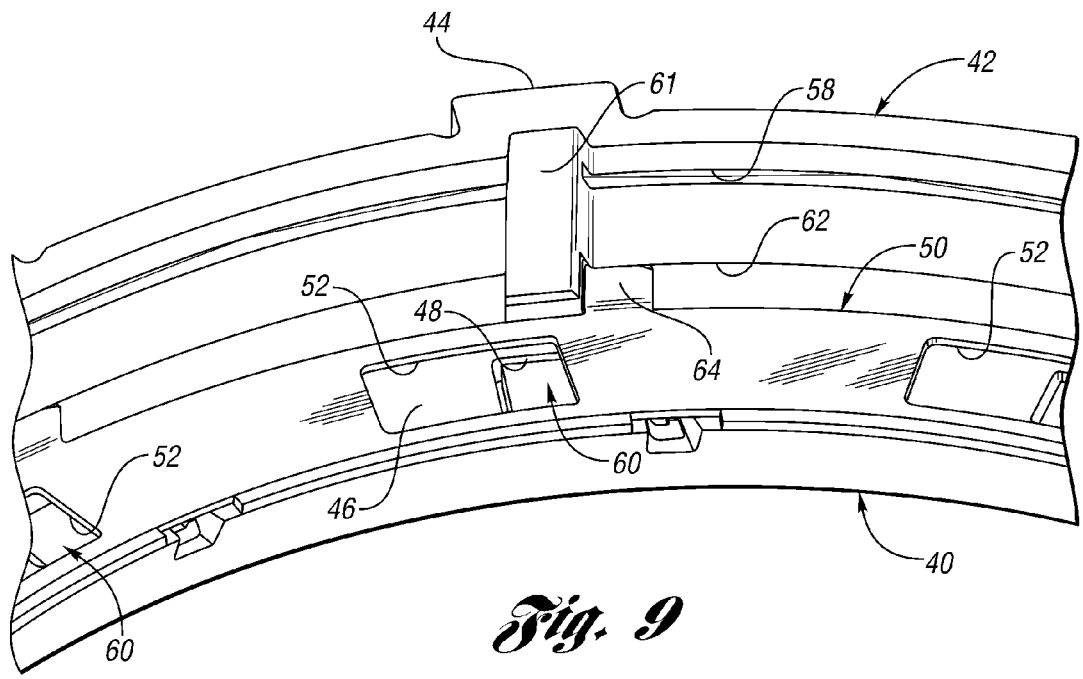

FIG. 3 shows the selector plate 50 being held down or retained within a circumferentially extending groove formed in the inner surface of the wall 42 without the need for a snap ring or axial tab.

Although any suitable strut spring can be used with the different embodiments of the invention, a coil spring such as the coil spring 30 of FIG. 10 is typically located under each of the reverse pawls 60 within inner recesses 49 formed in the recesses 48 as shown in FIGS. 1 and 3.

When the notch plate is received within or nested within the pocket plate 40 with the control plate 50 therebetween, the pocket plate 40 and the notch plate are typically held axially fast by a retainer ring or snap-ring (not shown). The snap-ring is received and retained in a groove 58 formed in the wall 42 of the coupling member.

The reverse struts 60 may be formed from a length of thin, cold-formed stock material, such as a cold-drawn or cold-rolled wire of spheroidized and annealed SAE 1065 steel. Each strut 60 may be tumbled to achieve a suitable edge/corner break, such as a maximum of 0.015 inches; hardened at 1550° F.; oil quenched; and tempered at 350° F. to a minimum hardness of 53 Rockwell-C.

It is to be understood that instead of the coupling assembly disclosed above, a second embodiment coupling assembly having radial ratchets may also be provided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A controllable or selectable coupling assembly having an overrun mode, the assembly comprising:

first and second coupling members including first and second coupling faces, respectively, in close-spaced opposition with one another, wherein at least one of the members is mounted for rotation about an axis, the first coupling face having a plurality of recesses, each of the recesses defining a load-bearing first shoulder, the second coupling face having at least one recess defining a load-bearing second shoulder;

a locking member disposed between the coupling faces of the coupling members, the locking member being movable between first and second positions, the first position being characterized by abutting engagement of the locking member with a respective shoulder of each coupling member and the second position being characterized by a non-abutting engagement of the locking member with at least one of the coupling members;

a control element mounted for controlled movement between the coupling faces and operable to control position of the locking member, the control element having at least one opening which extends completely therethrough to allow the locking member to extend therethrough to the first position in a control position of the control element; and a retainer mechanism operative to allow limited movement of the control element towards the first coupling face and prevent the control element from contacting the first coupling member in the overrun mode thereby reducing spin losses when the assembly is disengaged.

2. The assembly as claimed in claim 1, wherein the mechanism includes at least one groove formed in the first coupling member and at least one part integrally formed with the control element to move therewith, the at least one part being slidably received and retained within its respective groove to allow the controlled and limited movements.

3. The assembly as claimed in claim 2, wherein the at least one part comprises a hold down tab.

4. The assembly as claimed in claim 1, wherein the mechanism includes an annular retaining member to retain the second coupling member and the control element together.

5. The assembly as claimed in claim 4, wherein the retaining member comprises a snap ring.

6. The assembly as claimed in claim 1, wherein one of the coupling members is a notch plate and the other of the coupling members is a pocket plate.

7. The assembly as claimed in claim 1, wherein the assembly is a controllable or selectable one-way clutch assembly.

8. The assembly as claimed in claim 1, wherein the locking member is a reverse strut.

9. The assembly as claimed in claim 1, wherein the control element is a control or selector plate rotatable about the axis.

10. A controllable or selectable coupling assembly having an overrun mode, the assembly comprising:

first and second coupling members including first and second coupling faces, respectively, in close-spaced opposition with one another, wherein at least one of the members is mounted for rotation about an axis, the first coupling face having a plurality of recesses, each of the recesses defining a load-bearing first shoulder, the second coupling face having at least one recess defining a load-bearing second shoulder;

at least one locking member disposed between the coupling faces of the coupling members, each locking member being movable between first and second positions, the first position being characterized by abutting engagement of the locking member with a respective shoulder of each coupling member and the second position being characterized by a non-abutting engagement of the locking member with at least one of the coupling members;

at least one biasing member carried by the second coupling member to bias its respective locking member toward the first position;

a control element mounted for controlled movement between the coupling faces and operable to control position of each locking member, the control element having at least one opening which extends completely therethrough to allow its respective locking member to extend therethrough to the first position in a control position of the control element wherein each biased locking member applies a locking member force on the control element; and a retainer mechanism operative to isolate the locking member force of each biased locking member and prevent the control element from contacting the first coupling member in the overrun mode thereby reducing spin losses when the assembly is disengaged wherein the mechanism includes at least one groove formed in the first coupling member and at least one part integrally formed with the control element to move therewith, the at least one part being slidably received and retained within its respective groove to allow the controlled movement.

11. The assembly as claimed in claim 10, wherein the at least one part comprises a hold down tab.

12. The assembly as claimed in claim 10, wherein each biasing member includes a biasing spring.

13. The assembly as claimed in claim 12, wherein each recess of the second coupling face includes an inner recess to receive its respective biasing spring.

14. A controllable or selectable coupling assembly having an overrun mode, the assembly comprising:

first and second coupling members including first and second coupling faces, respectively, in close-spaced opposition with one another, wherein at least one of the members is mounted for rotation about an axis, the first coupling face having a plurality of recesses, each of the recesses defining a load-bearing first shoulder, the second coupling face having at least one recess defining a load-bearing second shoulder;

at least one locking member disposed between the coupling faces of the coupling members, each locking member being movable between first and second positions, the first position being characterized by abutting engagement of the locking member with a respective shoulder of each coupling member and the second position being characterized by a non-abutting engagement of the locking member with at least one of the coupling members;

at least one biasing member carried by the second coupling member to bias its respective locking member toward the first position;

a control element mounted for controlled movement between the coupling faces and operable to control position of each locking member, the control element having at least one opening which extends completely therethrough to allow its respective locking member to extend therethrough to the first position in a control position of the control element wherein each biased locking member applies a locking member force on the control element; and a retainer mechanism operative to isolate the locking member force of each biased locking member and prevent the control element from contacting the first coupling member in the overrun mode thereby reducing spin losses when the assembly is disengaged wherein the mechanism includes a snap ring to retain the second coupling member and the control element together.

15. A controllable or selectable coupling assembly having an overrun mode, the assembly comprising:

first and second coupling members including first and second coupling faces, respectively, in close-spaced opposition with one another, wherein at least one of the members is mounted for rotation about an axis, the first coupling face having a plurality of first recesses, each of the first recesses defining a load-bearing first shoulder, the second coupling face having a plurality of second recesses, each of the second recesses defining a load-bearing second shoulder;

a plurality of locking members disposed between the coupling faces of the coupling members, each of the locking members being movable between first and second positions, the first position being characterized by abutting engagement of a locking member with a respective shoulder of each coupling member and the second position being characterized by a non-abutting engagement of the locking member with at least one of the coupling members;

a control element mounted for controlled movement between the coupling faces and operable to control position of the locking members, the control element having a plurality of openings which extends completely therethrough to allow each of the locking members to extend therethrough to its respective first position in a control position of the control element; and a retainer mechanism operative to allow limited movement of the control element towards the first coupling face and prevent the control element from contacting the first coupling member in the overrun mode thereby reducing spin losses when the assembly is disengaged.

16. The assembly as claimed in claim 15, wherein the mechanism includes at least one groove formed in the first coupling member and at least one part integrally formed with the control element to move therewith, the at least one part being slidably received and retained within its respective groove to allow the controlled and limited movements.

17. The assembly as claimed in claim 16, wherein the at least one part comprises a hold down tab.

18. The assembly as claimed in claim 15, wherein the mechanism includes an annular retaining member to retain the second coupling member and the control element together.

19. The assembly as claimed in claim 18, wherein the retaining member comprises a snap ring.

20. The assembly as claimed in claim 15, wherein the coupling faces are annular coupling faces.

21. The assembly as claimed in claim 20, wherein the annular coupling faces are oriented to face axially along the axis.

* * * * *

UNITED STATES PATENT AND TRADEMARK OFFICE
CERTIFICATE OF CORRECTION

PATENT NO. : 9,188,174 B2  
APPLICATION NO. : 14/150074  
DATED : November 17, 2015  
INVENTOR(S) : Carl T. Beiser et al.

Page 1 of 1

It is certified that error appears in the above-identified patent and that said Letters Patent is hereby corrected as shown below:

On the title page

Page 1, under "Related U.S. Application Data" Section:

After item "(62)"  
Delete "Division" and  
Insert -- Continuation-In-Part --.

Signed and Sealed this  
Twenty-ninth Day of March, 2016

Michelle K. Lee  
*Director of the United States Patent and Trademark Office*